UNITED STATES PATENT OFFICE.

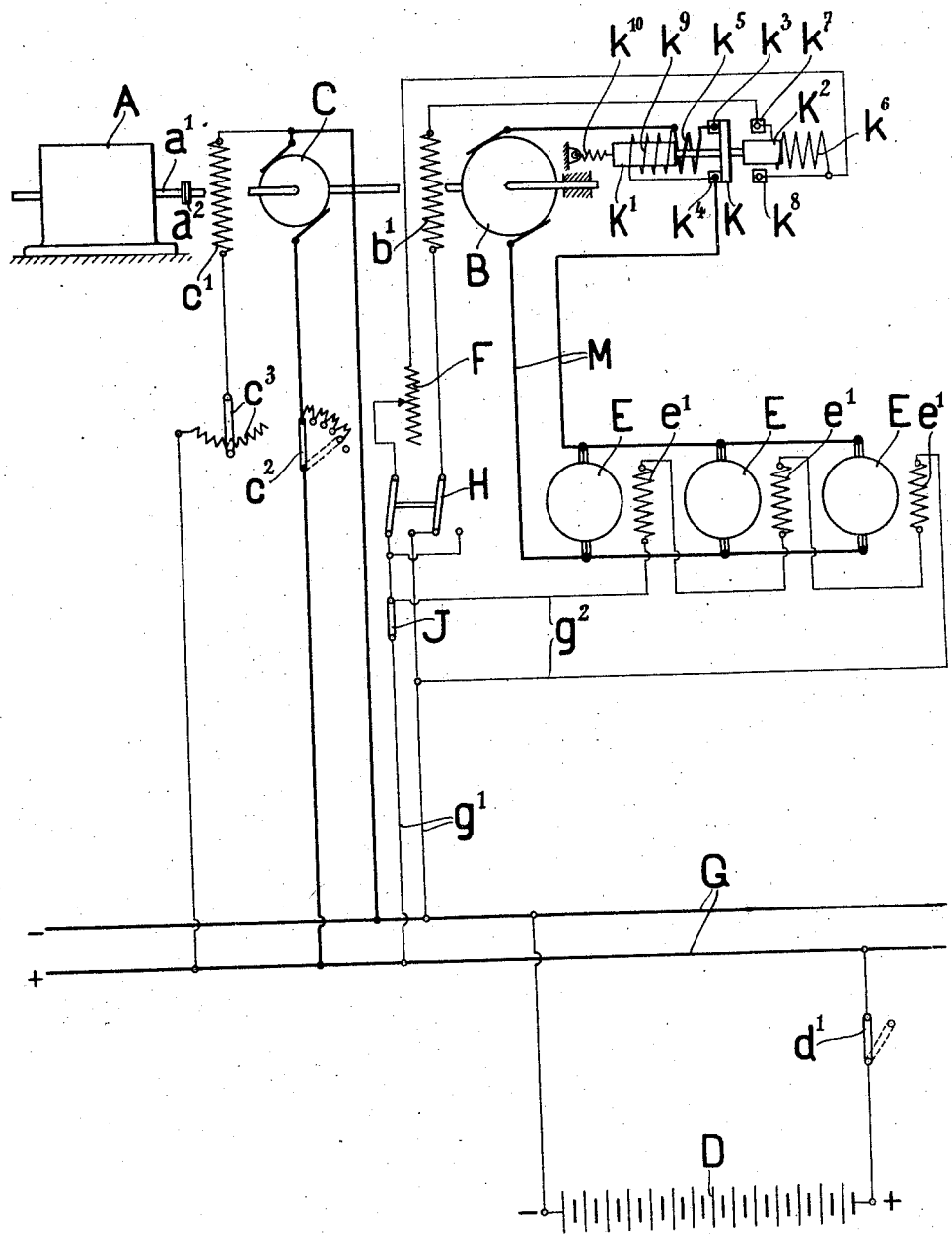

LUDWIG SCHÖN, OF ESSEN-ON-THE-RUHR, GERMANY, ASSIGNOR TO FRIED. KRUPP AKTIENGESELLSCHAFT, OF ESSEN-ON-THE-RUHR, GERMANY.

ELECTRIC LOCOMOTIVE.

1,418,977.   Specification of Letters Patent.   Patented June 6, 1922.

Application filed December 7, 1920. Serial No. 429,023.

*To all whom it may concern:*

Be it known that I, Dr. LUDWIG SCHÖN, residing at Essen-on-the-Ruhr, Germany, a citizen of the German Republic, have invented a certain new and useful Improvement in an Electric Locomotive, of which the following is a specification.

This invention relates to electric locomotives of the kind in the case of which the current required for the traction motors is supplied by a continuous current generator driven by an internal combustion engine, and with which the traction motors are in communication by means of a Leonard's connection. The object of this invention is to provide an electric locomotive of this kind, excelling by its extreme economy of working and considerable overloading capacity, and which requires for the internal combustion engine, outside of the actual motor oil (say, for instance, coal-tar oil), no special high grade light oil for starting purposes, such as what is called igniting oil.

One embodiment of the subject matter of this invention is shown by way of example in the accompanying drawing illustrating a system of connection of a Diesel-electric locomotive.

The armatures B and C of two continuous current generators B, $b^1$ and C, $c^1$ are positively connected to the driving shaft $a^1$ of the Diesel engine A by means of a detachable coupling $a^2$. To the armature B of one of the continuous current generators there are connected by means of a Leonard's connection the armatures E of three separately excited traction motors 9, $e^1$; said armatures being mutually interconnected in parallel, and moreover positively connected by the intervention of toothed transmission gears with the driving shafts of the locomotive. The armature C of the other continues current generator dynamo C $c^1$, constructed so as to constitute a shunt generator is connected through a switch $c^2$ which enables the shunt generator to be connected as a motor to bus bars G to which storage battery D is applied. This battery, which is adapted to be disconnected from the bus bars G by a cut-out $d^1$, serves, on the one hand, as a balancing battery for the current generator C $c^1$, while, on the other hand, it represents a supplementary source of electrical supply by means of which the shunt generator C $c^1$ may be operated as a motor, while at the same time it may serve to feed the exciting windings $b^1$ and $e^1$ of the continuous current generator B $b^1$ and E $e^1$. The continuous current generator C $c^1$ is so dimensioned as to be able not only to supply the current required to excite the generator B $b^1$ and the three traction motors E $e^1$, but, when acting as a motor it is enabled to also substantially assist the Diesel-engine A; say, for example, when starting or when taking gradients. The intensity of the exciting current in the exciting winding $c^1$ of the generator C $c^1$ may be controlled by a regulating resistance $c^3$. The exciting winding $b^1$ of the generator B $b^1$ is disposed in a main $g^1$ connected to the bus bars G, said main comprising, besides the exciting winding $b^1$ and a magnet winding $k^6$ the purpose of which will be explained hereinafter, an unipolar cut-out J, a bipolar throw-over switch H and a regulating resistance F, which last forms the controller for the locomotive. The unipolar cut-out J may be connected to the brake rods of the locomotive in such-wise that when the brake is applied it is opened, and vice versa. From the main $g^1$ to the rear of the unipolar cut-out J, there branches off an additional main $g^2$ along the course of which the three exciting windings $e^1$ of the three traction motors are disposed in series connection.

The magnet winding $k^6$ connected in series to the exciting winding $b^1$ of the generator B $b^1$, is wound around the magnet core $K^2$ of an overload current switch arranged as follows: Along the main M, establishing connection between the armature B of the generator B $b^1$ with the armatures E connected in parallel and appertaining to the traction motors E, $e^1$, there are disposed a main current magnet winding $k^5$, wound about a magnet core $k^1$, and a break formed by two switch-blocks $k^3$ and $k^4$ and adapted to be bridged by a contact piece K. The magnet cores $K^1$ and $K^2$ are disposed coaxially relatively to each other and are rigidly connected to the contact piece K. A tension spring $k^{10}$ is adapted to engage the free end of the magnet core $K^1$; said spring tending to retain the switch in the closing position, shown in the drawing against the action of the magnet windings $k^5$ and $k^6$. Two switch blocks $k^7$ and $k^8$ are connected to the ends of the magnet winding $k^6$ which are so arranged as to be electrically interconnected by the contact piece K when the switch is in the off position. It thus follows, that when the switch is in this last-named position, the winding $k^6$ will be short-circuited. Around the magnet core $K^1$ there is further wound a magnet winding $k^9$ communicating with its one end at the point of connection of the main current winding $k^5$ with the armature B, and with its other end with the switch block $k^4$, so that when the switch is in the closing position it is short-circuited by the contact piece K, while when the switch assumes the off-position it is traversed by a current the intensity of which depends upon the difference existing between the armature voltages of the generator B $b^1$ and of the traction motors E $e^1$. The magnet winding $k^9$ is so dimensioned that it is able to retain the switch in its off position against the action of the tension spring $k^{10}$, and this for as long as a perceptible difference of voltage will prevail between the armatures B and E. Again, the magnet windings $k^5$ and $k^6$ are so dimensioned that at the full intensity of the exciting current within the circuit of the winding $k^6$ and at a current intensity within the armature circuit M exceeding a predetermined value, the switch, operating under the united action of the magnet windings $k^5$ and $k^6$ and against the action of the spring $k^{10}$ will be shifted from the closing into the off position.

In considering the manner of operation of the described arrangement let it be primarily assumed that both the locomotive and the Diesel engine A are at a standstill, further that the brake be applied and that consequently the unipolar switch J be in the off position, and the controller F in its zero position. It is moreover assumed that the storage battery D is charged and the battery switch $d^1$ in the off position.

If it be now desired to start the locomotive into operation, then the Diesel-engine must primarily be started. To this end, after the cut-out $d^1$ has been closed, the starting resistance $c^2$ disposed in the armature circuit of the shunt generator C $c^1$, is completely put in series and the regulating resistance $c^3$, disposed in the exciting circuit of said generator, is reduced to zero. The shunt generator C $c^1$ now receives current from the battery D and starts running as a motor while gradually cutting out the starting resistance $c^2$. For the purpose of effecting a further increase of its speed, the intensity of the exciting circuit is reduced by aid of the regulating resistance $c^3$, at the same time weakening the field produced by the exciting winding $c^1$. In the course of this operation, the Diesel engine running along on no load and the armature B of the Leonard generator B $b^1$ coupled to the driving shaft $a^1$, gradually assume their normal working speed. As soon as this latter has been attained, the Diesel-engine is applied with fuel (motor oil). As a result the shunt generator C $c^1$ driven by the Diesel engine A, now operates as a current generator, the voltage of which may be controlled by suitable adjustment of the regulating resistance $c^3$ in suchwise that the generator C $c^1$ will be caused to supply current to the battery D. Hereupon, the brake is released and the switch J, positively connected to said brake, is thereby put in the closing position, so that now current will also be supplied to the exciting windings $e^1$ of the traction motors E $e^1$. The throw-over switch H having further been shifted into the position corresponding to the desired direction of travel of the locomotive, the resistance of the controller F is gradually reduced, so that now the exciting winding $b^1$ of the Leonard generator B $b^1$ will receive an increasing intensity of current. At the same time, a voltage is produced within the armature B which causes within the armature circuit of the Leonard connection, a current intensity corresponding to the starting resistance. The result is that the motors E $e^1$ go on, and the locomotive comes into motion. The driving speed desired having been attained, the controller F is held in its position, so that no further acceleration of the motors E $e^1$ takes place and the current intensity within the armature circuit will drop to the normal value corresponding to the driving speed.

By either cutting in or out resistances within the exciting circuit of the Leonard generator B $b^1$ by means of the controller F, the driving speed of the locomotive may either be lessened or increased.

The motors E $e^1$ may be brought to a stop by switching in resistance by means of the controller F. Then the armature of the generator B $b^1$ assumes a lower voltage than actually corresponds to the counter-electromotive force of the armatures E due to the momentary driving speed, so that a current is caused to flow in the reversed direction through the armature circuit of the Leonard system of connection. By these means, the current generator B $b^1$ is converted into a motor, driven by the motors E $e^1$ now in their turn acting as current generators. The increase in the number of revolutions of the armature C of the shunt generator C $c^1$ taking place in consequence, creates an increase of voltage in this latter and therewith an increased transmission of electrical energy to the storage battery D. Hence there is caused to take place an electrical brake action with a return of current without rendering necessary the reversal of any armatures or exciting windings. The electrical brake action may now be either continued until the locomotive has been brought to a full stop, or else the mechanical brake may be applied, and by placing the cut-out J in the off position caused by this mechanical braking, deprive the exciting circuits of the Leonard connection of current, so that the current will become extinct within the armature circuit. In either case the Leonard generator B $b^1$ will continue to run with no load, while the shunt generator C $c^1$ will, according to necessity, either also be caused to run with no load or will be used for the purpose of further charging the battery D.

It it obvious that, particularly when descending a slope, there may also take place a recovery of current without the driving speed being thereby reduced to such an extent as to bring the locomotive to a full stop.

The disconnecting of the Diesel-engine A (which need only be effected when the locomotive is brought to a stop for any considerable length of time) is brought about by cutting off the motor oil supply.

The magnet winding $k^5$ of the switch K $k^{10}$ is traversed during the first part of the acceleration period of the motors E $e^1$ by a current which is considerably more powerful than the normal current. Notwithstanding, the magnetic pull of the overload switch does in general during this time not suffice to put this latter in the off position. For since the exciting current of the generator B $b^1$ affected by the controller F and traversing the magnet winding $k^6$ of the overload switch and constantly increasing, during the period of acceleration, only attains its full intensity when the normal speed of the locomotive is attained, the entire magnetic pull, the extent of which is determined by the two magnet windings $k^5$ and $k^6$, will at no time exceed a predetermined maximum value. If, on the other hand, there should happen to arise either previous to or upon the conclusion of the period of acceleration any unforeseen overloading of the armature circuit, then the magnetic pull of the magnet winding $k^5$ will rapidly increase to such a degree that the overload switch will be opened. The conditions required for acceleration are so chosen, in view of the slight overloading capacity of the Diesel-engine A, that the intensity of the armature current will constantly drop soon after the period of acceleration has set in. Therefore the overload switch may be so adjusted that it will enter into function even after the termination of the period of acceleration and when only a comparatively slight overloading takes place.

The armature circuit having been interrupted by the opening of the overload switch and the magnet winding $k^6$ having been short-circuited by the contact piece K, the overload switch is only retained in its off position by the magnet winding $k^9$. Again as a result of the breaking of the armature circuit M, the counter electromotive force of the armatures E, now slowing down, is gradually reduced, while the voltage corresponding to the position assumed by the controller F still continues to prevail at the armature terminals of the generator B $b^1$. If now the controller be shifted with the view to reducing the exciting current to such an extent that no difference of potential will exist intermediate the terminal of the armature B connected to the magnet winding $k^5$ and the terminals of the armatures E, disposed in parallel connection and on the other hand connected to the switch block $k^4$, then the magnet winding $k^9$, which so far retained the overload switch in the off position, becomes dead, and the said switch, returns into its closing position under the action of its tension spring $k^{10}$ even before the motor armatures E have completely come to a stop. Hence, a current is caused to traverse afresh the armature circuit of the Leonard-system, which prevents the motors from being entirely put out of operation. The speed of the locomotive may now be regulated according to requirement by suitably setting the controller F. Owing to the fact that the putting in anew of the overload switch can only be carried through in the event of an equality of voltage between the armatures B and E, there is no liability of any objectionable rushes of current occuring when the switch is put in again. In this respect the improved arrangement embodies the advantage that the switch may be put in again before the motors E $e^1$ have come to a stop and without it having been necessary to bring the controller back into its zero position.

The arrangement of the balancing battery D not only offers the advantage already mentioned of allowing the current to be recovered during the electrical brake action, but it also considerably augments the overloading capacity of the entire system. If, for example, the locomotive is obliged to travel along a rather steep upward slope then the said battery D may be employed for the purpose of feeding the shunt engine C $c^1$ in the manner of a motor. This latter will then assist the Diesel-engine A and thereby increase the tractive effort of the same. The changing over from the one to the other manner of working the shunt engine C $c^1$, is effected automatically on the regulating resistance $c^3$ being adjusted to a value determined by practical experience.

Besides this, the battery D conjointly with the shunt engine C $c^1$ now acting as a motor, and the starting resistance $c^2$, affords the additional possibility, also already mentioned, of starting the Diesel-engine A. By these means not only the customary pneumatic starting device may be dispensed with, but also the necessity of employing a high grade light oil. This means that besides the motor oil, no special so-called igniting oil need be taken along.

In order to prevent any excessive development of smoke, such as is apt to arise at low load owing to the cooling off of the Diesel-engine, the motor oil supply for said engine may be entirely cut off shortly before bringing the locomotive to a stop or while it is stopping at a station, and the engine C $c^1$, and B $b^1$ may be driven in the manner of converters by aid of the battery D, the driving shaft $a^1$ of the Diesel-engine running along with no load. Hence it is not necessary to start the Diesel-engine afresh before again setting the locomotive running. The fact of the supply of motor oil being always temporarily cut off at the stations incorporates the advantage of not only avoiding a development of smoke but in addition, also that of securing a not inconsiderable saving of motor oil.

In the place of three traction motors such as E $e^1$ it stands to reason that also two or merely one such motor may be arranged. The toothed transmission gears intermediate the motors and the driving shafts may in that case be replaced in the known manner by a crank gearing having a blank shaft or the like.

Claims.

1. Electric locomotive having an internal combustion engine adapted to act as driving engine of a separately excitable direct current generator supplying the current for the traction motors, said traction motors being separately excitable and electrically connected to said generator, an electro-magnetic switch interposed between said motors and said generator and adapted to open the armature circuit of said generator in case of an overload, said switch being controlled by a plurality of magnetic windings excitable independently of each other, and means for supplying the exciting current required for the current generator and the motors comprising an exciting dynamo positively connected to the generator and a storage battery connected in parallel to the latter.

2. Electric locomotive having an internal combustion engine adapted to act as a driving engine of a separately excitable direct current generator supplying the current for the traction motors, said traction motors being separately excitable and electrically connected to said generator, an electro-magnetic switch interposed between said motors and said generator and adapted to open the armature circuit of said generator in case of an overload, said switch having a magnetic winding excitable in dependence on the current strength of the armature circuit and another magnetic winding excitable in dependence on the exciting current strength of said generator and means for supplying the exciting current required for the current generator and the motors comprising an exciting dynamo positively connected to the generator and a storage battery connected in parallel to the latter.

3. Electric locomotive according to claim 1, in which said overload switch is influenced by the strength of current of the armature of the generator, said overload switch being provided with a contact piece serving to close and break the armature circuit, which contact piece is under the action of a power accumulator and of three magnet windings, one of which is excitable in dependence on the current strength in the generator armature circuit, the second in dependence on the exciting current strength of the generator, the third in dependence on the difference in the armature voltage of the generator and the motors.

4. Electric locomotive according to claim 2, provided with a starting resistance in the armature circuit of the exciting dynamo.

5. An overload switch according to claim 2, characterized by the fact that the magnet winding which is excited in dependence on the exciting current strength of the generator, is short-circuited on the opening of the armature circuit, by the contact piece.

6. An electric locomotive of the class described comprising a combustion engine, a current generator, traction motors, said motors being connected to said current generator, said generator and traction motors being separately excitable, an overload switch interposed in the connection between said motors and generator and controlled by three magnetic windings excitable independently of each other, a dynamo positively connected to said generator and said engine and a storage battery connected in parallel to said dynamo.

7. An electric locomotive of the class described comprising an engine, a current generator, a multiplicity of traction motors, means electrically connecting said current generator to said traction motors for supplying current to the same, said traction motors being connected in parallel and being separately excitable, a dynamo positively connected to said engine and to said generator, a storage battery connected in parallel with said dynamo and an overload switch interposed in the circuit between said current generator and said traction motors, said overload switch being provided with a contact piece adapted to open and close the circuit which includes the armature of said current generator, a spring tending to hold said contact piece in closed position and three magnet windings two of which, upon excitation, tend to open said switch and break said armature circuit, and the third winding tending to keep said switch closed as long as there exists a difference of potential between the armatures of said current generator and said motors, substantially as and for the purpose described.

The foregoing specification signed at Essen, Germany, this 26th day of July, 1920.

LUDWIG SCHÖN.

In presence of—
HANS GOTTSMANN,
JOHANN DECKERS.